(12) United States Patent
Lundin

(10) Patent No.: US 10,279,993 B2
(45) Date of Patent: May 7, 2019

(54) LEAK PREVENTING APPLIANCE AND METHOD FOR PREVENTING LIQUID FROM LEAKING OUT OF A DAMAGED TANK

(71) Applicant: Christer Lundin, Åsarna (SE)

(72) Inventor: Christer Lundin, Åsarna (SE)

( * ) Notice: Subject to any disclaimer, the term of this patent is extended or adjusted under 35 U.S.C. 154(b) by 13 days.

(21) Appl. No.: 15/568,088

(22) PCT Filed: Apr. 15, 2016

(86) PCT No.: PCT/SE2016/050329
§ 371 (c)(1),
(2) Date: Oct. 20, 2017

(87) PCT Pub. No.: WO2016/171605
PCT Pub. Date: Oct. 27, 2016

(65) Prior Publication Data
US 2018/0118455 A1    May 3, 2018

(30) Foreign Application Priority Data

Apr. 22, 2015  (SE) ...................... 1550480

(51) Int. Cl.
*B65D 90/32* (2006.01)
*B65D 90/24* (2006.01)
(Continued)

(52) U.S. Cl.
CPC ............. *B65D 90/32* (2013.01); *B65D 90/22* (2013.01); *B65D 90/24* (2013.01);
(Continued)

(58) Field of Classification Search
CPC ........ B65D 90/32; B65D 90/24; B65D 90/22; Y10T 137/5762; B25J 15/0616; B65G 47/91

See application file for complete search history.

(56) References Cited

U.S. PATENT DOCUMENTS

| | | | | | |
|---|---|---|---|---|---|
| 4,707,012 | A | * | 11/1987 | Takagi | ................... B65G 47/91 414/752.1 |
| 5,511,752 | A | * | 4/1996 | Trethewey | ............ B25B 11/007 248/205.8 |

(Continued)

FOREIGN PATENT DOCUMENTS

| | | |
|---|---|---|
| BE | 895083 A2 | 3/1983 |
| DE | 1525465 B | 2/1970 |

(Continued)

*Primary Examiner* — Eric Keasel
*Assistant Examiner* — Kevin R Barss
(74) *Attorney, Agent, or Firm* — Dilworth & Barrese, LLP

(57) ABSTRACT

A leak preventing appliance and method for preventing liquid from leaking out of a damaged tank (2). The appliance comprises a suction head (4) to be pressed against an outer wall (5) of the tank under the effect of an underpressure generated by a vacuum pump (3). The suction head comprises a first chamber (6) and a second chamber (9) arranged around the first chamber. Each chamber has an opening (7, 10) intended to face said tank wall. The suction head is attachable to the tank wall under the effect of a reduced pressure produced in the second chamber by the vacuum pump. The first chamber is connectable to the vacuum pump via a valve device (8), which is configured to keep the first chamber connected to the vacuum pump when a reduced pressure produced in the second chamber by the vacuum pump is below a threshold value and to otherwise keep the first chamber disconnected from the vacuum pump.

20 Claims, 3 Drawing Sheets

(51) Int. Cl.
*B65D 90/22* (2006.01)
*B25J 15/06* (2006.01)
*B65G 47/91* (2006.01)

(52) U.S. Cl.
CPC .......... *B25J 15/0616* (2013.01); *B65G 47/91* (2013.01); *Y10T 137/5762* (2015.04)

(56) References Cited

U.S. PATENT DOCUMENTS

2006/0232085 A1* 10/2006 Nagasawa ............. B25B 11/005
294/189
2013/0147101 A1* 6/2013 Cho .................... B25J 15/0616
269/21

FOREIGN PATENT DOCUMENTS

| DE | 19616856 A1 | 4/1997 |
|----|-------------|--------|
| EP | 1754924 A1 | 2/2007 |
| GB | 1020581 A | 2/1966 |
| JP | 2014-020429 A | 2/2014 |
| WO | 87/02650 A1 | 5/1987 |

* cited by examiner

LEAK PREVENTING APPLIANCE AND METHOD FOR PREVENTING LIQUID FROM LEAKING OUT OF A DAMAGED TANK

FIELD OF THE INVENTION AND PRIOR ART

The present invention relates to a leak preventing appliance for preventing liquid from leaking out of a damaged tank. The invention also relates to a method for preventing liquid from leaking out of a damaged tank.

Liquid fuel and other types of liquids may be transported and stored in tanks of various types. If such a tank is damaged, for instance due to an accident or wear, the liquid in the tank may leak to the surrounding environment, which may cause a lot of problem, for instance in the form of material damages, environmental pollution and health and safety hazards for people in the vicinity of the leaking tank. It is previously known, for instance from GB 1 020 581 A and DE 1 525 465 B, that liquid may be prevented from leaking out through a leak below the surface of the liquid in a tank by producing a sufficient underpressure in a gas-filled space above the surface of the liquid in the tank by means of a vacuum pump.

A leak preventing appliance according to the preamble of claim 1 is previously known from WO 87/02650 A1. This previously known appliance has the form of a leak sealing pad which is to be attached to an outer wall of a tank so as to cover a leak opening in the tank wall and thereby prevent gas or liquid from flowing out of the tank through the leak opening. The pad is pressed against the tank wall under the effect of an underpressure generated in a vacuum chamber of the pad by means of a vacuum pump. However, this leak preventing appliance is only suitable for use when it comes to an easily accessible leak concentrated to a limited area.

OBJECT OF THE INVENTION

The object of the present invention is to provide a new and favourable leak preventing appliance for preventing liquid from leaking out of a damaged tank.

SUMMARY OF THE INVENTION

According to the present invention, the above-mentioned object is achieved by a leak preventing appliance having the features defined herein.

The leak preventing appliance of the present invention comprises:
- a vacuum pump;
- a suction head to be pressed against an outer wall of the tank under the effect of an underpressure generated by the vacuum pump, wherein the suction head comprises:
  - a first chamber with an opening intended to face said tank wall when the suction head is pressed against it; and
  - at least one second chamber arranged around the first chamber and connected to a suction side of the vacuum pump, the second chamber having an opening intended to face said tank wall so as to allow the suction head to be pressed against the tank wall and thereby be attached to it when a reduced pressure is produced in the second chamber by the vacuum pump; and
- a valve device which is configured to keep the first chamber connected to the suction side of the vacuum pump when a reduced pressure produced in the second chamber by the vacuum pump is below a threshold value and to otherwise keep the first chamber disconnected from the suction side of the vacuum pump.

With the leak preventing appliance of the present invention, a leak-preventing underpressure may be achieved inside a tank in a simple manner, wherein one and the same vacuum pump is used for producing the desired underpressure inside the tank as well as an underpressure that keeps the suction head attached to an outer wall of the tank. When in use, the first chamber of the suction head is intended to be in fluid communication with a gas-filled upper space of a damaged tank via a hole made in an outer wall of the tank above the surface of the liquid in the tank, and an underpressure produced in said upper space of the tank by the vacuum pump is intended to prevent the liquid in the tank from leaking out of the tank through a leak opening at another part of the tank below the surface of the liquid in the tank. Thus, the suction head is not to be applied over the leak opening and the leak preventing appliance of the present invention may consequently be used even if the leak opening is inaccessible.

According to an embodiment of the invention, the valve device is a spring-loaded check valve. Hereby, the invention can be implemented in a rather simple and cost-efficient manner.

According to another embodiment of the invention, the valve device is adjustable so as to allow the above-mentioned threshold value to be set by an operator or an electronic control system. Hereby, the underpressure produced by the vacuum pump in the second chamber may be adjusted in dependence on the prevailing requirements in order to allow the suction head to be pressed against the tank wall with a suitable pressing force.

According to another embodiment of the invention, the leak preventing appliance comprises a pressure limiter for limiting the underpressure in the first chamber. Hereby, damages to the tank due to an excessively low pressure inside the tank may be avoided in a simple manner.

According to another embodiment of the invention, a liquid separator is arranged in a suction line between the first chamber and the suction side of the vacuum pump. Hereby, liquid is prevented from being sucked into the vacuum pump from the tank together with evacuated air.

Further advantageous features of the leak preventing appliance of the present invention will appear from the following description and the dependent claims.

The invention also relates to a method having the features defined herein for preventing liquid from leaking out of a damaged tank.

Further advantageous features of the method of the present invention will appear from the following description.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1:
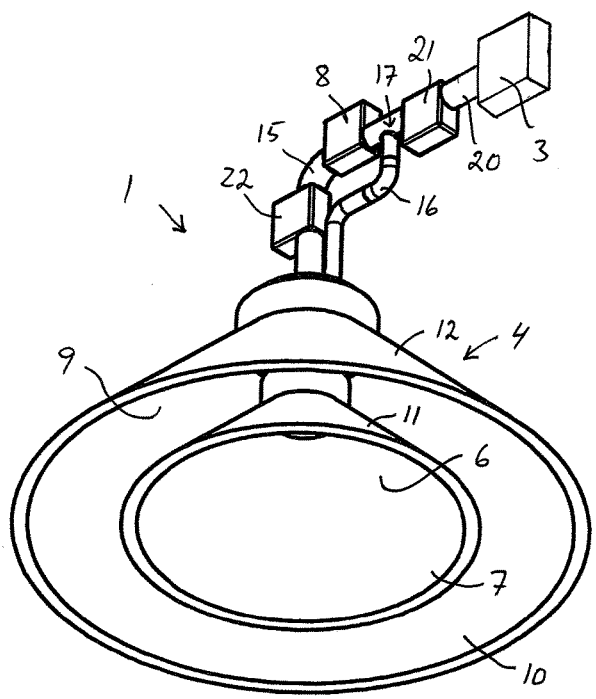
FIG. 1 is a schematic perspective view from below of a leak preventing appliance according to a first embodiment of the present invention.
Figure 2:
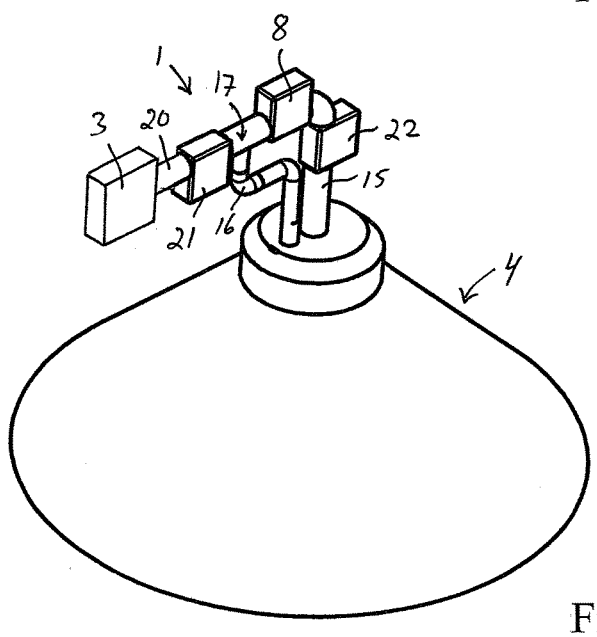
FIG. 2 is a schematic perspective view from above of the leak preventing appliance of FIG. 1.
Figure 3:
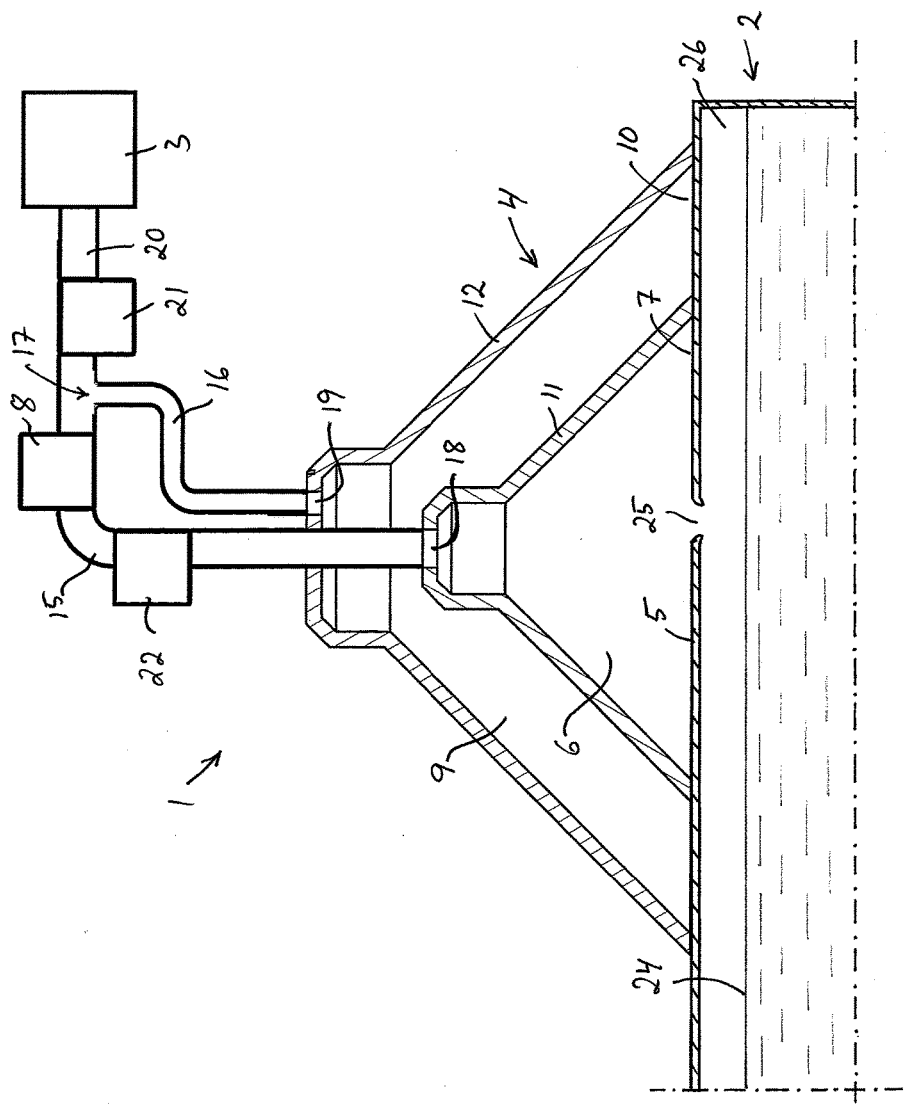
FIG. 3 is a schematic and partly cut lateral view of the leak preventing appliance of FIG. 1, as seen with the suction head of the leak preventing appliance attached to an outer wall of a tank.

A leak preventing appliance 1 according to an embodiment of the present invention is schematically illustrated in FIGS. 1-3. The leak preventing appliance 1 comprises a vacuum pump 3 and a suction head 4, wherein the suction head 4 is to be pressed against an outer wall 5 of a tank 2 under the effect of an underpressure generated by the vacuum pump 3.

The suction head 4 comprises a first chamber 6 with an opening 7 which is to face said tank wall 5 when the suction head 4 is pressed against it. The first chamber 6 is connectable to a suction side of the vacuum pump 3 via a valve device 8 so as to allow a reduced pressure to be produced in the first chamber 6 by the vacuum pump 3.

The suction head 4 further comprises a second chamber 9 which is arranged around the first chamber 6 and connected to the suction side of the vacuum pump 3. The second chamber 9 has an opening 10 which is intended to face said tank wall 5 so as to allow the suction head 4 to be pressed against the tank wall 5 and thereby be attached to it when a reduced pressure is produced in the second chamber 9 by the vacuum pump 3. In the illustrated example, said opening 10 of the second chamber 9 is annular and surrounds said opening 7 of the first chamber 6.

In the illustrated embodiment, the suction head 4 comprises a partition wall 11 which surrounds the first chamber 6 and separates the first chamber 6 from the second chamber 9, and an outer wall 12 which surrounds the second chamber 9 and separates the second chamber 9 from the ambient air. The partition wall 11 and the outer wall 12 of the suction head 4 are preferably of rubber, but may as an alternative be of any other suitable material.

The above-mentioned valve device 8 is configured to keep the first chamber 6 connected to the suction side of the vacuum pump 3 when a reduced pressure produced in the second chamber 9 by the vacuum pump 3 is below a threshold value, and to otherwise keep the first chamber 6 disconnected from the suction side of the vacuum pump 3. Thus, the valve device 8 is configured to be in a closed position, and thereby keep the first chamber 6 disconnected from the vacuum pump 3, until the pressure in the second chamber 9 has been reduced to a given level under the effect of the vacuum pump 3, whereupon the valve device 8 assumes an open position and thereby allows a reduced pressure to be produced in the first chamber 6 under the effect of the vacuum pump 3. Said threshold value is so chosen that the reduced pressure already produced in the second chamber 9 when the valve device 8 is shifted from the closed position to the open position is sufficient for keeping the suction head 4 firmly attached to the tank wall 5.

The valve device 8 is with advantage a spring-loaded check valve, such as for instance a spring-loaded ball check valve. The valve device 8 is preferably adjustable so as to allow the above-mentioned threshold value to be set by an operator or by an electronic control system connected to the valve device.

In the embodiment illustrated in FIGS. 1-3, the first chamber 6 is connectable to the suction side of the vacuum pump 3 via a first suction line 15, whereas the second chamber 9 is connected to the suction side of the vacuum pump 3 via a second suction line 16, which is connected to the first suction line 15 at a junction point 17. The first suction line 15 is connected to an outlet opening 18 of the first chamber 6 and the second suction line 16 is connected to an outlet opening 19 of the second chamber 9. A third suction line 20 extends between said junction point 17 and the suction side of the vacuum pump 3. The valve device 8 is arranged in the first suction line 15 between the first chamber 6 and said junction point 17. In the illustrated embodiment, the first, second and third suction lines 15, 16, 20 are formed of rigid pipes, which are capable of supporting the vacuum pump 3 and the valve device 8.

A liquid separator 21 is with advantage arranged between the first chamber 6 and the suction side of the vacuum pump 3 in order to trap any liquid that might follow the air flow towards the vacuum pump. This liquid separator 21 may for instance be arranged in the above-mentioned third suction line 20, as illustrated in FIGS. 1-3, or in the above-mentioned first suction line 15.

The leak preventing appliance 1 preferably comprises a pressure limiter 22 for limiting the underpressure in the first chamber 6. This pressure limiter 22 is arranged in the above-mentioned first suction line 15 and is with advantage an adjustable pressure limiter so as to allow the minimum level of the pressure in the first chamber 6 to be set by an operator or by an electronic control system connected to the pressure limiter.

Figure 4:
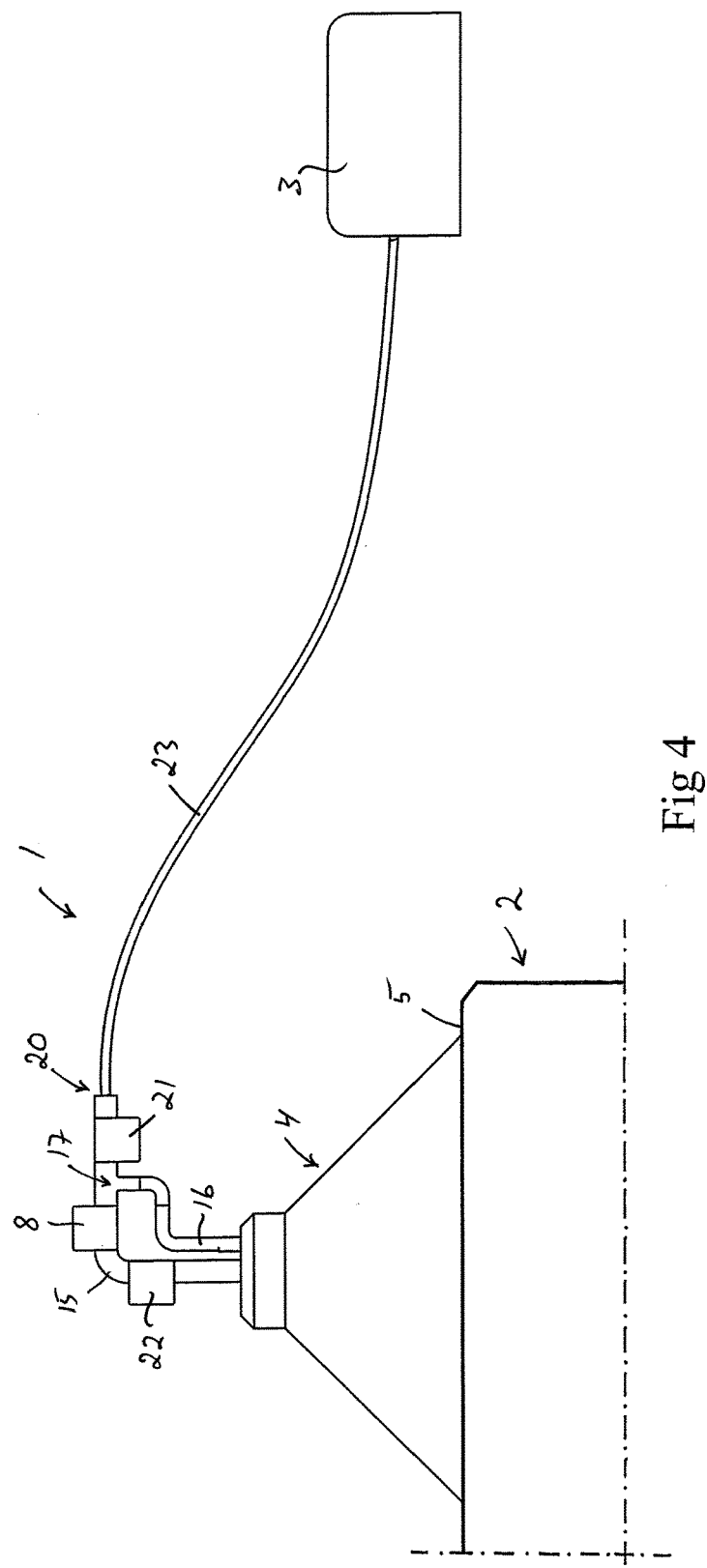
FIG. 4 is a schematic lateral view of a leak preventing appliance according to a second embodiment of the invention, as seen with the suction head of the leak preventing appliance attached to an outer wall of a tank.

In the embodiment illustrated in FIG. 4, a part of the third suction line 20 is formed by a flexible hose 23, to thereby allow the vacuum pump 3 to be located at a distance from the suction head 4. As to the rest, the leak preventing appliance 1 illustrated in FIG. 4 corresponds to the leak preventing appliance described above with reference to FIGS. 1-3. As a further alternative, the vacuum pump 3, the valve device 8, the pressure limiter 22 and the liquid separator 21, or only some of these components, may be jointly arranged in a housing which is fixed to and supported by the suction head 4 or connected to the suction head through flexible hoses.

The leak preventing appliance 1 is to be used for preventing liquid from leaking out through a hole or crack in a wall of a damaged liquid containing tank 2 below the surface 24 of the liquid in the tank. To enable the use of the leak preventing appliance 1, an outer wall 5 of the tank 2 is first penetrated so as to make a hole 25 into a gas-filled upper space 26 in the tank above the surface 24 of the liquid in the tank. The suction head 4 of the leak preventing appliance 1 is then applied against the outer wall 5 of the tank 2 with the opening 7 of the first chamber 6 covering said hole 25 and with the opening 10 of the second chamber 9 out of contact with said hole 25. Thereafter, the vacuum pump 3 of the leak preventing appliance 1 is operated to reduce the pressure in the second chamber 9 to thereby cause the suction head 4 to be pressed against the outer wall 5 of the tank 2 so as to be attached to it. When the vacuum pump 3 starts operating, the valve device 8 is at first in its closed position and thereby prevents the vacuum pump 3 from sucking air from the first chamber 6. When the vacuum pump 3 has reduced the pressure in the second chamber 9 to a given level, the valve device 8 will assume its open position and thereby allow the vacuum pump 3 to reduce the pressure in the first chamber 6 and in said upper space 26 of the tank 2 to such a low value that leakage of liquid from the tank 2 is prevented.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A leak preventing appliance for preventing liquid from leaking out of a damaged tank (2), the leak preventing appliance (1) comprising a vacuum pump (3) and a suction head (4) to be pressed against an outer wall (5) of the tank (2) under the effect of an underpressure generated by the vacuum pump (3), wherein the suction head (4) comprises:
   a first chamber (6) with an opening (7) intended to face said tank wall (5) when the suction head (4) is pressed against it; and
   at least one second chamber (9) arranged around the first chamber (6) and connected to a suction side of the vacuum pump (3), the second chamber (9) having an opening (10) intended to face said tank wall (5) so as to allow the suction head (4) to be pressed against the tank wall (5) and thereby be attached to it when a reduced pressure is produced in the second chamber (9) by the vacuum pump (3), and
   the first chamber (6) is connectable to the suction side of the vacuum pump (3) via a valve device (8), which is configured to keep the first chamber (6) connected to the suction side of the vacuum pump (3) when a reduced pressure produced in the second chamber (9) by the vacuum pump (3) is below a threshold value and to otherwise keep the first chamber (6) disconnected from the suction side of the vacuum pump (3).

2. A leak preventing appliance according to claim 1, wherein the valve device (8) is a spring-loaded check valve.

3. A leak preventing appliance according to claim 2, wherein the leak preventing appliance (1) comprises a pressure limiter (22) for limiting the underpressure in the first chamber (6).

4. A leak preventing appliance according to claim 2, wherein the valve device (8) is adjustable to allow said threshold value to be set by an operator or an electronic control system.

5. A leak preventing appliance according to claim 4, wherein the leak preventing appliance (1) comprises a pressure limiter (22) for limiting the underpressure in the first chamber (6).

6. A leak preventing appliance according to claim 5, wherein the pressure limiter (22) is an adjustable pressure limiter to allow the minimum level of the pressure in the first chamber (6) to be set by an operator or an electronic control system.

7. A leak preventing appliance according to claim 2, wherein the valve device (8) is a spring-loaded ball check valve.

8. A leak preventing appliance according to claim 7, wherein the valve device (8) is adjustable to allow said threshold value to be set by an operator or an electronic control system.

9. A leak preventing appliance according to claim 8, wherein the leak preventing appliance (1) comprises a pressure limiter (22) for limiting the underpressure in the first chamber (6).

10. A leak preventing appliance according to claim 7, wherein the leak preventing appliance (1) comprises a pressure limiter (22) for limiting the underpressure in the first chamber (6).

11. A leak preventing appliance according to claim 1, wherein the valve device (8) is adjustable sa as to allow said threshold value to be set by an operator or an electronic control system.

12. A leak preventing appliance according to claim 11, wherein the leak preventing appliance (1) comprises a pressure limiter (22) for limiting the underpressure in the first chamber (6).

13. A leak preventing appliance according to claim 1, wherein the leak preventing appliance (1) comprises a pressure limiter (22) for limiting the underpressure in the first chamber (6).

14. A leak preventing appliance according to claim 13, wherein the pressure limiter (22) is an adjustable pressure limiter to allow the minimum level of the pressure in the first chamber (6) to be set by an operator or an electronic control system.

15. A leak preventing appliance according to claim 1, wherein the leak preventing appliance (1) comprises a liquid separator (21) arranged in a suction line between the first chamber (6) and the suction side of the vacuum pump (3).

16. A leak preventing appliance according to claim 1, wherein
   the first chamber (6) is connectable to the suction side of the vacuum pump (3) via a first suction line (15);
   that the second chamber (9) is connected to the suction side of the vacuum pump (3) via a second suction line (16),
   the second suction line (16) is connected to the first suction line (15) at a junction point (17); and
   the valve device (8) is arranged in the first suction line (15) between the first chamber (6) and said junction point (17).

17. A leak preventing appliance according to claim 1, wherein said opening (10) of the second chamber (9) is annular and surrounds said opening (7) of the first chamber (6).

18. A leak preventing appliance according to claim 1, wherein the suction head (4) comprises:
   a partition wall (11) which surrounds the first chamber (6) and separates the first chamber (6) from the second chamber (9); and
   an outer wall (12) which surrounds the second chamber (9) and separates the second chamber (9) from the ambient air.

19. A leak preventing appliance according to claim 18, wherein the partition wall (11) and the outer wall (12) of the suction head (4) are of rubber.

20. A method for preventing liquid from leaking out of a damaged liquid containing tank (2), wherein
   an outer wall (5) of the tank (2) is penetrated to make a hole (25) into a gas-filled upper space (26) above the surface (24) of the liquid in the tank (2);
   the suction head (4) of a leak preventing appliance (1) according to claim 1 is applied against the outer wall (5) of the tank (2) with the opening (7) of the first chamber (6) covering said hole (25) and with the opening (10) of the second chamber (9) out of contact with said hole (25); and
   that the vacuum pump (3) of the leak preventing appliance (1) is operated to reduce the pressure in the second chamber (9) to thereby cause the suction head (4) to be pressed against the outer wall (5) of the tank (2) to be attached to it, whereupon the vacuum pump (3) is operated to reduce the pressure in the first chamber (6) and in said upper space (25) of the tank (2) and keep the pressure therein at such a low value that leakage of liquid from the tank (2) is prevented.

* * * * *